(12) United States Patent
Huang et al.

(10) Patent No.: US 6,181,840 B1
(45) Date of Patent: Jan. 30, 2001

(54) REFLECTIVITY-TUNABLE FIBER OPTIC REFLECTOR

(75) Inventors: Ding-Wei Huang, Taipei; Wen-Fung Liu; Cheng-Wen Wu, both of Taoyuan; Chih-Chung Yang, Taipei, all of (TW)

(73) Assignee: National Science Council, Taipei (TW)

( * ) Notice: Under 35 U.S.C. 154(b), the term of this patent shall be extended for 0 days.

(21) Appl. No.: 09/366,992

(22) Filed: Aug. 4, 1999

(30) Foreign Application Priority Data

Jun. 25, 1999 (TW) .................................................. 88110720

(51) Int. Cl.[7] .................................................. G02F 1/295
(52) U.S. Cl. .................................. 385/10; 385/28; 385/43
(58) Field of Search .................................. 385/8, 10, 27, 385/28, 43, 7

(56) References Cited

U.S. PATENT DOCUMENTS

| | | | | |
|---|---|---|---|---|
| 4,832,437 | * | 5/1989 | Kim et al. ........................ | 350/96.15 |
| 5,007,705 | * | 4/1991 | Morey et al. ..................... | 350/96.29 |
| 5,039,221 | * | 8/1991 | Layton et al. ..................... | 356/345 |
| 5,706,375 | * | 1/1998 | Mihailov et al. .................. | 385/24 |
| 5,875,272 | * | 2/1999 | Kewitsch et al. ................. | 385/37 |
| 5,915,050 | * | 6/1999 | Russell et al. .................... | 385/7 |
| 6,058,226 | * | 5/2000 | Starodubov ....................... | 385/12 |

\* cited by examiner

Primary Examiner—Frank G. Font
Assistant Examiner—Michael P. Mooney
(74) Attorney, Agent, or Firm—Fish & Richardson P.C.

(57) ABSTRACT

A reflectivity-tunable fiber reflector is disclosed. The Bragg reflectivity of the fiber grating is modulated by exciting the transverse vibration of the fiber through an acoustic wave. The excitation of the transverse vibration, leading to fiber grating tilting and fiber micro-bending, induces the coupling of the fiber core mode into cladding modes. This leads to the reduction of core-mode power and hence that of Bragg reflection. This mechanism is applied by this invention to control the reflectivity of a fiber optic Bragg grating after fabrication. The fiber reflector is suitable for fiber-compatible acousto-optical switching.

13 Claims, 4 Drawing Sheets

Transverse
Vibration

Transverse
Vibration

REFLECTIVITY-TUNABLE FIBER OPTIC REFLECTOR

BACKGROUND OF THE INVENTION

1. Field of the Invention

This invention relates to an optical reflecting device, especially to a reflectivity-tunable reflector, and more particularly relates to a reflectivity-tunable fiber optic Bragg grating reflector.

2. Description of Prior Art

Fiber optic Bragg gratings have been widely used in opto-electronic applications due to the advantages of low loss, high reliability, low cost, and direct connectability with fiber system, etc. For example, fiber gratings have been applied to the fabrication of sensors (stress, temperature, magnetic field, and accelerating velocity, etc), wavelength-stabilizing and narrowing elements for lasers, and filters, wavelength selectors, multiplexers and dispersion compensaters used in optical fiber communications.

The fabrication and the basic operation principles of fiber gratings are described below.

With the exposure to UV lasers through an interferometer or phase mask, the refractive index of the core of a fiber becomes periodically changed along the optical axis so as to form a fiber grating.

The most significant feature of a fiber optic Bragg grating is the relatively narrow bandwidth of its reflection spectrum. The reflection wavelength is determined by the grating period while the reflectivity is proportional to the depth of the refractive index modulation. Usually, the refractive index modulation can be as large as 0.001 with UV exposure of Ge-doped fiber and the reflectivity can be close to unity over the reflection band. Whatever the characteristics a fiber optic Bragg grating possesses, the reflectivity is fixed after it is fabricated. This property limits the application of a fiber optic Bragg grating. However, with an appropriate acoustic excitation method, the transverse vibration can induce the coupling between the core mode and the cladding modes; in this manner, the Bragg reflectivity of the fiber grating can be changed. The Bragg reflectivity can be varied from its original value down to almost zero. Hence, the device can serve as an acousto-optical fiber switch. Using an acoustic wave to control the behaviors of the mode coupling in optical fiber has been discussed.

In *Opt. Lett.*, 19, 1964 (1994), Birks et al. disclose the use of an acoustic wave to excite the transverse vibration of a four-port taper fiber coupler for shifting the coupling frequency. In *Opt. Lett.*, 21, 27 (1996), Yun et al. use an acoustic wave to achieve tunable filtering in a two-mode fiber coupler. Liu et al. use acoustic waves to excite the longitudinal vibration of a fiber optic Bragg grating for generating side bands of the reflection window in *J. Lightwave Tech.*, 16, 2006 (1998). The spectral location and intensity of the side bands are controlled by the acoustic frequency and intensity, respectively. Although this mechanism can also be used for modulating reflectivity, it includes several drawbacks: 1) Fiber gratings of high Bragg reflectivity are required for significant side-band generation; 2) The acoustic intensity needs to be quite strong for efficient operation; 3) the proximity of the side bands to the original reflection window makes applications difficult. This makes the prior art complicated and difficult to manufacture.

SUMMARY OF THE INVENTION

Accordingly, an object of this invention is to provide a reflectivity-tunable fiber grating reflector with a simple configuration, for which the Bragg reflectivity can be arbitrarily changed after the fiber grating is fabricated.

In this invention, with the excitation of transverse vibrations of a fiber grating, the Bragg reflectivity of a fiber grating can be directly modulated, even after it is fabricated with UV laser exposure.

The reflectivity-tunable fiber reflector of this invention, in which the reflectivity of a fiber grating can be modulated by exciting the transverse vibration of the fiber through an acoustic wave, comprises: a fiber optic Bragg grating; a voltage source; a piezoelectric transducer, which is connected to the voltage source; and a solid horn with a thick end and a thin end, the thick end being adhered to one end of the piezoelectric transducer and the thin end being transversely adhered to the fiber optic Bragg grating; wherein the Bragg reflectivity of the fiber grating is modulated by exciting the transverse vibration of the fiber by applying a voltage signal to the piezoelectric transducer, which generates an acoustic wave to the fiber through the solid horn.

The horn can be made of glass or metal. The horn can also be hollow and adhered longitudinally to the fiber grating. Furthermore, the horn can have a tilted surface. The fiber grating can be chemically etched to give it a tapered shape for increasing the amplitude of transverse vibrations.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

To assist in the explanation of this invention, the theory underlying the invention will now be explained.

Figure 1:
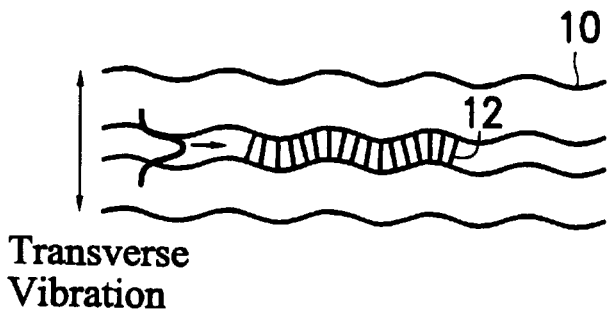
FIG. 1 is a diagram illustrating that an effect similar to that caused by a tilted fiber grating is produced while a fiber is transversely vibrated.

Acoustic waves in a fiber grating excite two types of vibrations, the longitudinal vibration and the transverse vibration. Two phenomena occur while the fiber grating vibrates transversely. First, the fiber grating swings in a small angle with respect to the direction perpendicular to the fiber axis, so as to produce an effect similar to that of a tilted fiber grating, which has two characteristics as disclosed in $J.$ $Opt.$ $Soc.$ $Am.$ A, 13, 296(1996) by T. Erdogan et al.: (i) the Bragg reflectivity of the fiber grating is changed. Referring to FIG. 1, the fiber grating 12 inclines with an angle in the fiber 10, so that the equivalent refractive index modulation for the optical field in the fiber grating is changed to change the Bragg reflectivity. (ii) The coupling of the core mode into the cladding modes increases. The core mode is apt to couple into the cladding modes after diffracted by the fiber grating since the fiber grating inclines with an angle. Therefore, the Bragg reflection of the fiber grating is changed.

Second, the optical signal of the core mode propagating in the positive direction is attenuated at the fiber micro-bending due to the coupling into the cladding modes propagating in the same direction. The coupling of the core mode into the cladding modes propagating in the opposite direction also occurs.

Figure 2:
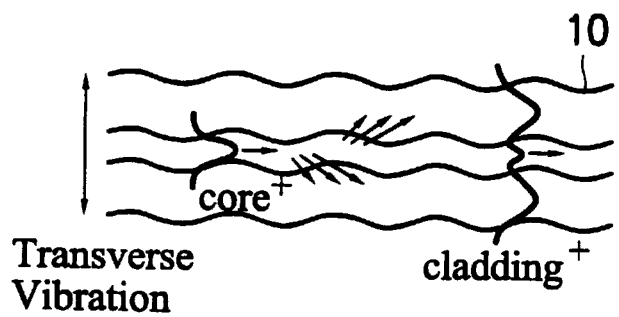
FIG. 2 illustrates that the excitation of the transverse vibration of a fiber, leading to fiber micro-bending, induces the coupling of the fiber core mode into cladding modes.
Figure 3:
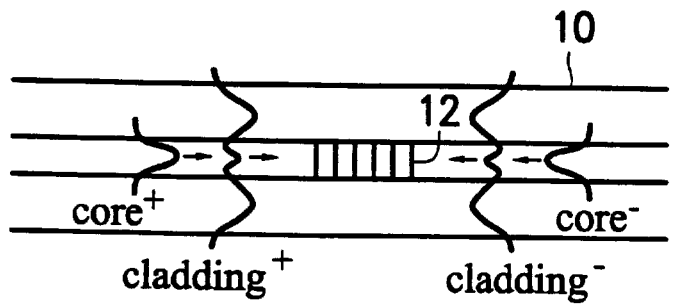
FIG. 3 illustrates that the diffraction of a transversely vibrated grating induces coupling between the core and cladding modes propagating in the positive direction with the core and cladding modes propagating in the negative direction, wherein fiber vibration is not explicitly drawn in the drawing.

Referring to FIG. 2, the core mode propagating in the positive direction (core$^+$) tends to couple into the cladding modes propagating in the positive direction (cladding$^+$) due to the fiber micro-bending in the transversely vibrating fiber 10. This causes the attenuation of the intensity of the core mode propagating in the positive direction. These modes propagating in the positive direction also couple with the core mode propagating in the opposite direction (core$^-$) and the cladding modes propagating in the opposite direction (cladding$^-$). As shown in FIG. 3, the coupling between all those modes is dependent on the amplitude of the transverse vibration.

According to the characteristics described above, using acoustic waves to excite the transverse vibration of the fiber causes the following results. First, the fiber grating periodically swings with an angle to produce an effect similar to that of a tilted fiber grating, so as to change the Bragg reflectivity. Second, the intensity of the core mode propagating in the positive direction is decreased due to the coupling of core mode into the cladding mode propagating in the positive direction; thus, the reflected intensity of the core mode is also decreased. Because of these two mechanisms, the change of the Bragg reflectivity, which depends on the change of the transversely vibrating amplitude of the fiber, can be observed. The changes of the reflection intensity at the cladding$^+$core$^-$ coupling wavelengths, which depend on the change of the transversely vibrating amplitude of the fiber, also can be observed, as shown in the two small humps of FIG. 10.

Figure 4:
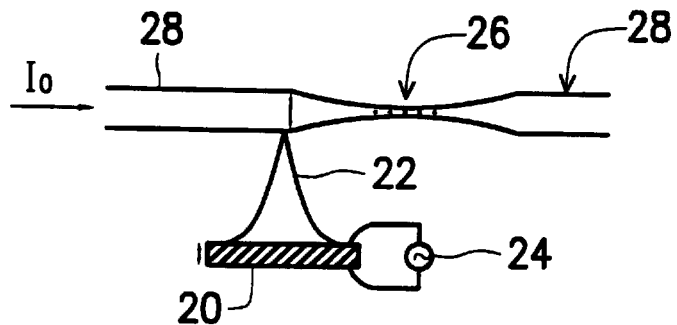
FIG. 4 is a diagram illustrating the configuration of a device for controlling the Bragg reflectivity of a fiber grating by transversely vibrating the fiber.

The configuration of the reflectivity-tunable fiber reflector of a first embodiment of this invention is shown in FIG. 4, which includes, a piezoelectric transducer (PZT) 20, a glass horn 22, a voltage source 24, a fiber optic Bragg grating 26, and an optical fiber 28. The tip of the glass horn 22 is transversely glued to the fiber optic Bragg grating 26. When a sinusoidal voltage signal from the voltage source 24 is applied to the PZT 20, the induced acoustic wave propagates through the horn 22 into the fiber with increasing amplitude along the horn 22. The acoustic wave excites the transverse vibration of the fiber so as to control the Bragg reflectivity of the fiber optic Bragg grating 26.

Figure 5:
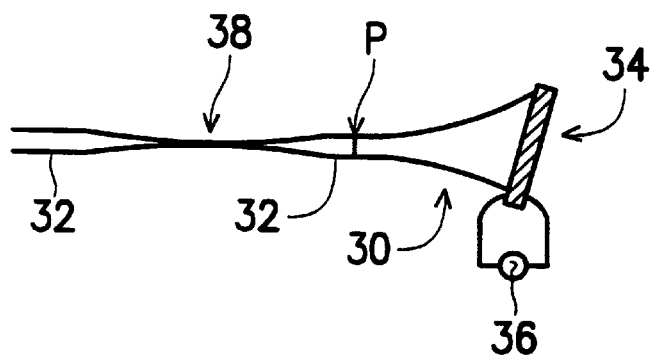
FIG. 5 is a diagram illustrating the configuration of a device for controlling the Bragg reflectivity of a fiber grating by exciting the transverse vibration by longitudinally vibrating the fiber in a tilted angle according to one embodiment of this invention.

Referring to FIG. 5, according to another embodiment of this invention, the tip of the solid glass horn 30 is spliced to the fiber 32 at the position indicated by the arrow P. The thick end of the solid glass horn 30 is cut to form a tilted surface and connected to the PZT 34. The voltage source 36 is applied to drive the PZT 34. While the acoustic wave propagates into the fiber 32, the transverse vibration (and a part of longitudinal vibration) of the fiber 32 is excited to change the reflectivity of the fiber optic Bragg grating 38.

Figure 6:
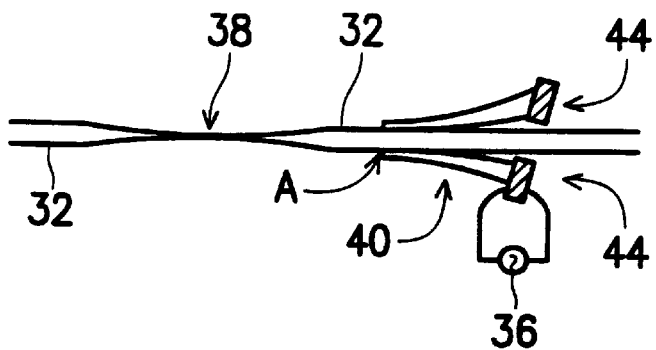
FIG. 6 is a diagram illustrating the configuration of a device for controlling the Bragg reflectivity of a fiber grating by exciting the transverse vibration by longitudinally vibrating the fiber in a tilted angle according to another embodiment of this invention.

According to the other embodiment of this invention, the configuration of FIG. 5 can be modified to that of FIG. 6 to provide a light-transmittable device. As shown in FIG. 6, instead of the solid glass horn 30, a hollow glass horn 40 is used. The tip of the hollow glass horn 40 is glued to the fiber 32 at the position indicated by the arrow A. The thick end of the hollow glass horn 40 is also formed with a tilted surface and connected to the PZT 44 so as to excite the transverse vibration of the fiber.

Figure 7:
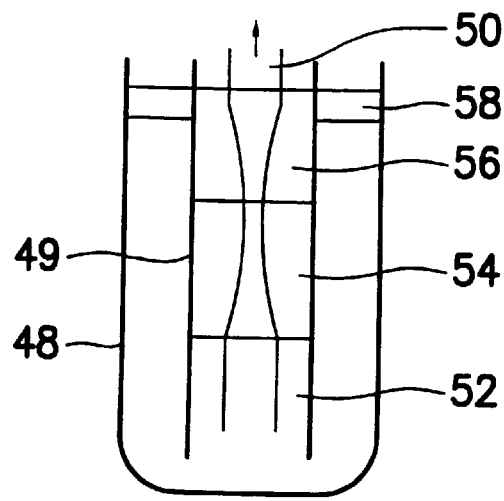
FIG. 7 is a diagram illustrating the configuration for etching a fiber into a tapered shape.

To further increase the amplitude of the transverse vibration in the fiber optic Bragg grating, the fiber cladding is etched with hydrofluoric acid to form a tapered shape. Referring to FIG. 7, the etching process is described as follows. The hydrofluoric acid 54 is suspended between xylene 56 and trichloro-ethylene 52 in the inner vessel 49. The outer vessel 48 is filled with trichloro-ethylene 52 and water 58. The fiber 50 is placed in the etchant and is pulled while being etched to form a tapered shape. The amplitude of the transverse vibration is increased at the tapered portion of the fiber. Moreover, such a tapered sectional fiber retains a good toughness and will not be easily broken.

Instead of glass, the horn used in the embodiment shown in FIG. 4 can be made of metal.

Figure 8:
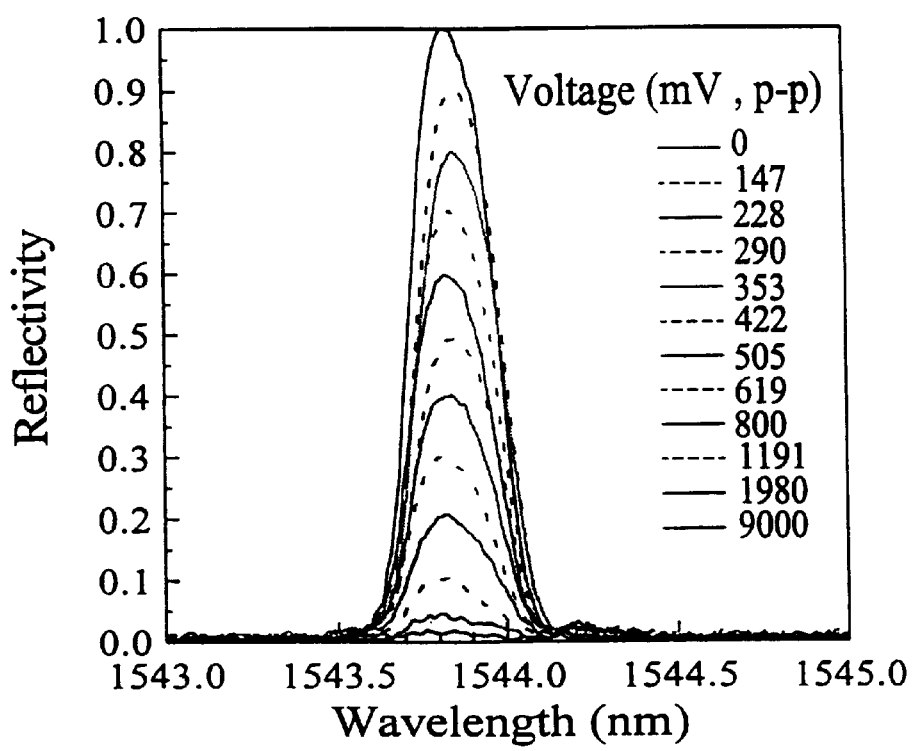
FIG. 8 shows the measured Bragg reflection spectra with various applied voltage levels.

It can be observed that various Bragg reflectivities of the reflectivity-tunable fiber reflector of this invention can be gained by applying various strengths of sinusoidal voltage signals to the PZT. FIG. 8 shows the measured reflection spectra with different applied (peak to peak) voltage values when the Bragg wavelength is 1543.82 nm. One can see that the peak reflectivity of the originally Gaussian-shape spectrum has dropped from almost unity down to almost zero as the applied voltage increases. The frequency of the sinusoidal voltage signals is 730 kHz.

Figure 9A:
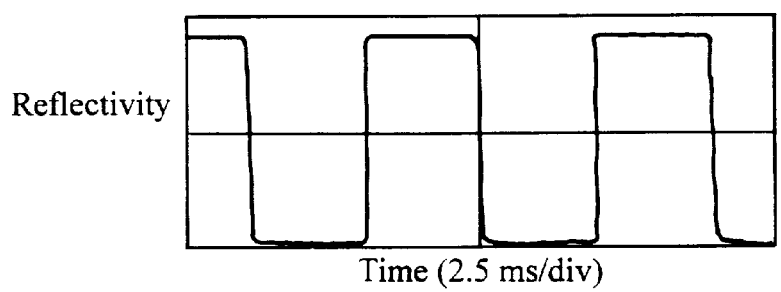
FIG. 9a shows the measured reflectivity at the central wavelength at 1543.82 nm with the applied voltage under periodical square-wave modulation
Figure 9B:
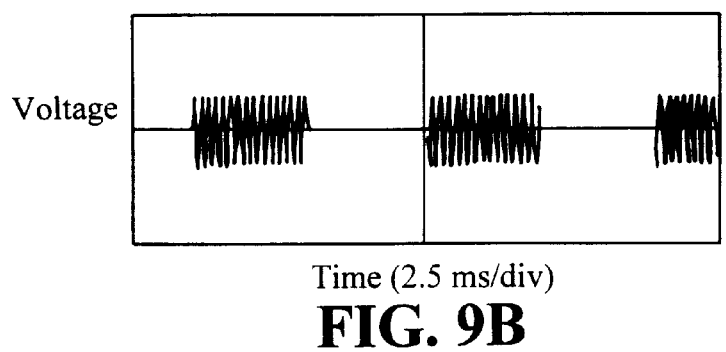
FIG. 9b shows the associated waveform of the voltage source, which is under periodical square-wave modulation, applied to the PZT.

The switching response of reflectivity at the central wavelength of the reflection band is shown in FIGS. 9$a$ and 9$b$. FIG. 9$b$ shows the waveform of the voltage source applied to the PZT. Here, the sinusoidal acoustic signal is modulated with a square wave with a frequency of 100 Hz and a duty cycle of 50%. FIG. 9$a$ shows the measured reflectivity at the central wavelength. The reflectivity is switched efficiently from unity to almost zero. By increasing the square wave frequency, it is found that the response speed of the acoustic switching could be as high as 5 kHz. The response speed of this device is controlled by the fiber grating length, the acoustic frequency, and the masses of the horn and PZT.

Figure 10:
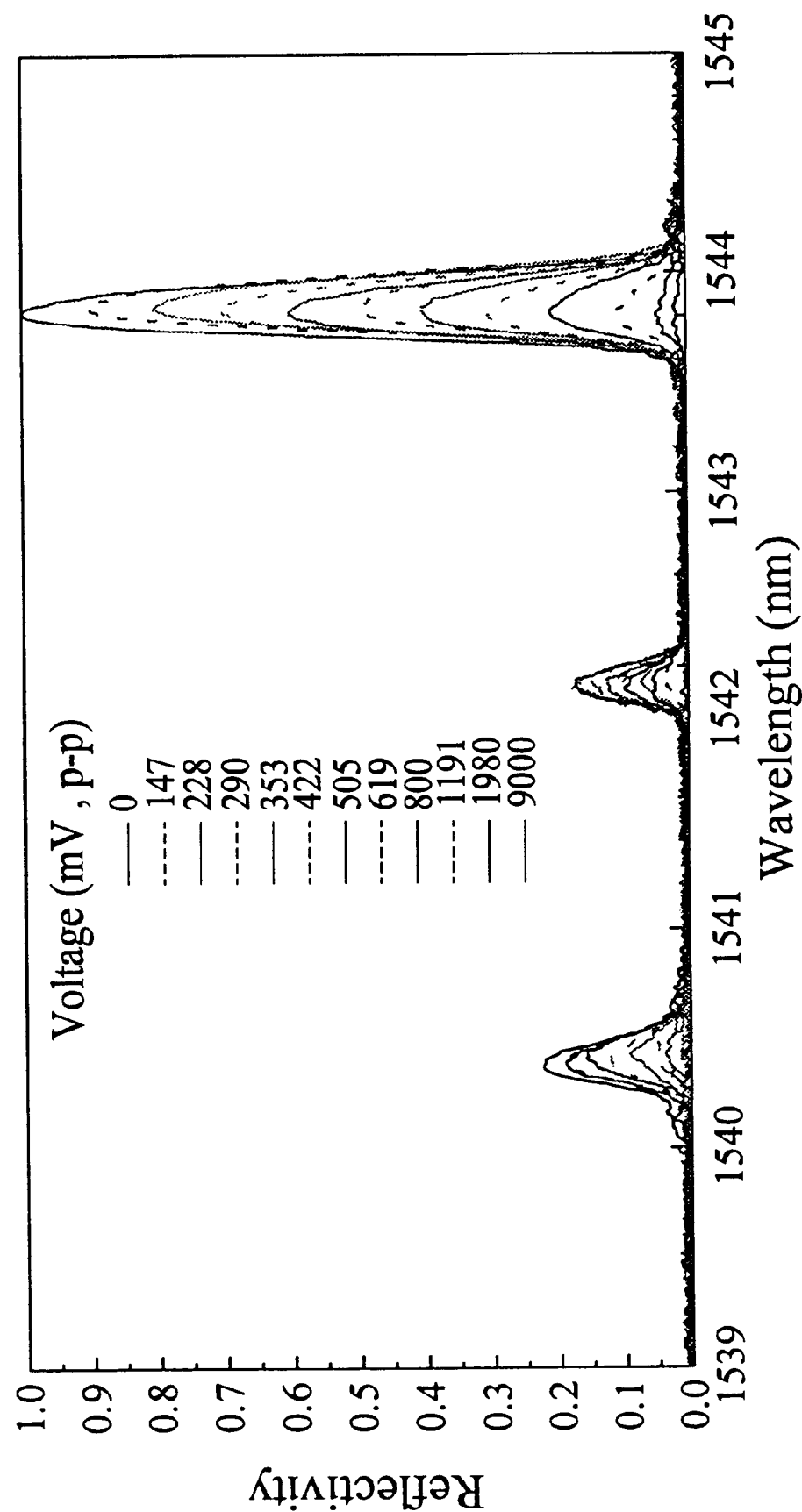
FIG. 10 shows the measured Bragg reflection spectra with various applied voltage levels in an enlarged measuring range of the spectrum.

Referring to FIG. 10, if the measured spectrum range is enlarged, the change of the reflection intensity can also be observed at the cladding$^+$-core$^-$ coupling wavelengths, 1540.4 nm and 1542.1 nm. It is found that the relation between these reflection intensities and the amplitude of the acoustic wavelength is complex since the change is irregular.

Furthermore, the fiber grating in the above embodiments includes all kinds of fiber Bragg grating with various chirping and apodization structures.

The present invention is not limited to the above-described embodiments. Variations and modifications may be made without departing from the scope of the present invention.

What is claimed is:

1. A reflectivity-tunable fiber reflector for which the reflectivity of a fiber grating is modulated by exciting the transverse vibration of the fiber through an acoustic wave, comprising:

a fiber optic Bragg grating;

a voltage source;

a piezoelectric transducer, which is connected to the voltage source; and a solid horn with a thick end and a thin end, the thick end being adhered to the piezoelectric transducer and the thin end being transversely adhered to the fiber optic Bragg grating;

wherein the Bragg reflectivity of the fiber grating is modulated by exciting the transverse vibration of the fiber by applying a voltage signal to the piezoelectric transducer, which generates an acoustic wave to the fiber through the solid horn.

2. A reflectivity-tunable fiber reflector as claimed in claim 1 wherein the horn is made of glass.

3. A reflectivity-tunable fiber reflector as claimed in claim 1 wherein the horn is made of metal.

4. A reflectivity-tunable fiber reflector as claimed in claim 1 wherein the horn is longitudinally adhered to the fiber grating.

5. A reflectivity-tunable fiber reflector as claimed in claim 4 wherein the horn is hollow.

6. A reflectivity-tunable fiber reflector as claimed in claim 4 wherein the thick end of the horn is formed with a tilted surface.

7. A reflectivity-tunable fiber reflector as claimed in claim 1 wherein the section of the fiber grating is etched with hydrofluoric acid to form a tapered cross section.

8. A reflectivity-tunable fiber reflector as claimed in claim 7 wherein the etching is achieved with the hydrofluoric acid suspended between xylene and trichloro-ethylene and with the immersed fiber pulled vertically step by step during the etching process.

9. A reflectivity-tunable fiber reflector as claimed in claim 1 wherein the Bragg grating is a chirped and apodized structure.

10. A reflectivity-tunable fiber reflector as claimed in claim 5 wherein the thick end of the horn is formed with a tilted surface.

11. A reflectivity-tunable fiber reflector as claimed in claim 4 wherein the section of the fiber grating is etched with hydrofluoric acid to form a tapered cross section.

12. A reflectivity-tunable fiber reflector as claimed in claim 11 wherein the etching is achieved with the hydrofluoric acid suspended between xylene and trichloro-ethylene and with the immersed fiber pulled vertically step by step during the etching process.

13. A reflectivity-tunable fiber reflector as claimed in claim 4 wherein the Bragg grating is a chirped and apodized structure.

* * * * *